(12) United States Patent
Nakashima et al.

(10) Patent No.: US 11,373,458 B2
(45) Date of Patent: Jun. 28, 2022

(54) REMOTE FUEL MONITORING SYSTEM, VEHICLE-MOUNTED DEVICE, VEHICLE OR MACHINE, SERVER, REMOTE FUEL MONITORING METHOD, REMOTE FUEL MONITORING PROGRAM AND STORAGE MEDIUM

(71) Applicant: GLOBAL MOBILITY SERVICE INC., Tokyo (JP)

(72) Inventors: Tokushi Nakashima, Tokyo (JP); Kazuhiro Umezawa, Tokyo (JP); Katsuyoshi Kurahashi, Tokyo (JP)

(73) Assignee: GLOBAL MOBILITY SERVICE INC., Tokyo (JP)

( * ) Notice: Subject to any disclaimer, the term of this patent is extended or adjusted under 35 U.S.C. 154(b) by 0 days.

(21) Appl. No.: 17/278,279

(22) PCT Filed: Sep. 21, 2018

(86) PCT No.: PCT/JP2018/035056
§ 371 (c)(1),
(2) Date: Mar. 19, 2021

(87) PCT Pub. No.: WO2020/059119
PCT Pub. Date: Mar. 26, 2020

(65) Prior Publication Data
US 2021/0312722 A1  Oct. 7, 2021

(51) Int. Cl.
*G07C 5/00* (2006.01)
*B60R 25/102* (2013.01)
(Continued)

(52) U.S. Cl.
CPC ............ *G07C 5/006* (2013.01); *B60R 25/102* (2013.01); *G06N 20/00* (2019.01); *G07C 5/008* (2013.01)

(58) Field of Classification Search
USPC ....................................................... 701/31.4
See application file for complete search history.

(56) References Cited

U.S. PATENT DOCUMENTS 9,261,396 B2 * 2/2016 Abhyanker ......... G01F 23/0061
2003/0065570 A1 * 4/2003 Fukushima .......... G06Q 10/087
705/22

(Continued)

FOREIGN PATENT DOCUMENTS

CN    102770888 A    11/2012
EP     3457346 A1    3/2019
(Continued)

OTHER PUBLICATIONS

International Search Report in PCT/JP2018/035056, dated Nov. 27, 2018. 5pp.

(Continued)

*Primary Examiner* — Tyler D Paige
(74) *Attorney, Agent, or Firm* — Hauptman Ham, LLP

(57) ABSTRACT

A remote fuel monitoring system includes a vehicle-mounted device and a server for monitoring a remaining fuel amount of the vehicle or the machine based on vehicle information received from the vehicle-mounted device, calculating a refueling plan including refueling time and a refueling amount for the vehicle or the machine, and outputting a refueling command based on the refueling plan for the vehicle or the machine to a refueling device. The server includes an input device, a storage, an analyzing device analyzing information regarding the remaining fuel amount of the vehicle or the machine based on the vehicle information and information stored in the storage, a refueling plan calculation device calculating the refueling plan for the vehicle or the machine by using the analyzed information regarding the remaining fuel amount, and an output device (Continued)

outputting the refueling plan for the vehicle or the machine to the refueling device.

8 Claims, 4 Drawing Sheets

(51) Int. Cl.
  *G06N 20/00* (2019.01)
  *G06Q 10/04* (2012.01)
  *G06Q 10/06* (2012.01)
  *G06Q 50/30* (2012.01)
  *B60K 15/077* (2006.01)

(56) References Cited

U.S. PATENT DOCUMENTS

| | | | |
|---|---|---|---|
| 2003/0149491 A1* | 8/2003 | Adachi | G08C 17/02 700/9 |
| 2007/0079804 A1* | 4/2007 | Nakayama | B60R 25/1004 123/339.15 |
| 2012/0296549 A1* | 11/2012 | Adams | G07C 5/085 701/102 |
| 2015/0239365 A1* | 8/2015 | Hyde | B60L 7/12 701/2 |
| 2015/0310674 A1* | 10/2015 | Humphrey | H04W 4/029 701/24 |
| 2015/0319913 A1 | 11/2015 | Foster et al. | |
| 2019/0122454 A1* | 4/2019 | Fukunaga | A01B 76/00 |

FOREIGN PATENT DOCUMENTS

| | | |
|---|---|---|
| JP | 2000181500 A | 6/2000 |
| JP | 200288822 A | 3/2002 |
| JP | 2003120405 A | 4/2003 |
| JP | 2009134502 A | 6/2009 |
| JP | 2009282838 A | 12/2009 |
| JP | 2010237112 A | 10/2010 |
| JP | 2012132181 A | 7/2012 |
| JP | 2015191608 A | 11/2015 |
| KR | 1020030028705 A | 4/2003 |
| KR | 1020150075855 A | 7/2015 |
| WO | 2005045778 A1 | 5/2005 |
| WO | 2017195395 A1 | 11/2017 |

OTHER PUBLICATIONS

Office Action in KR application No. 10-2021-7008135, dated Aug. 26, 2021, 16pp.
Office Action in CN application No. 201880097813.3, dated Aug. 11, 2021, 18pp.
Extended European Search Report in European Application No. 18934455.9 dated Feb. 22, 2022.

* cited by examiner

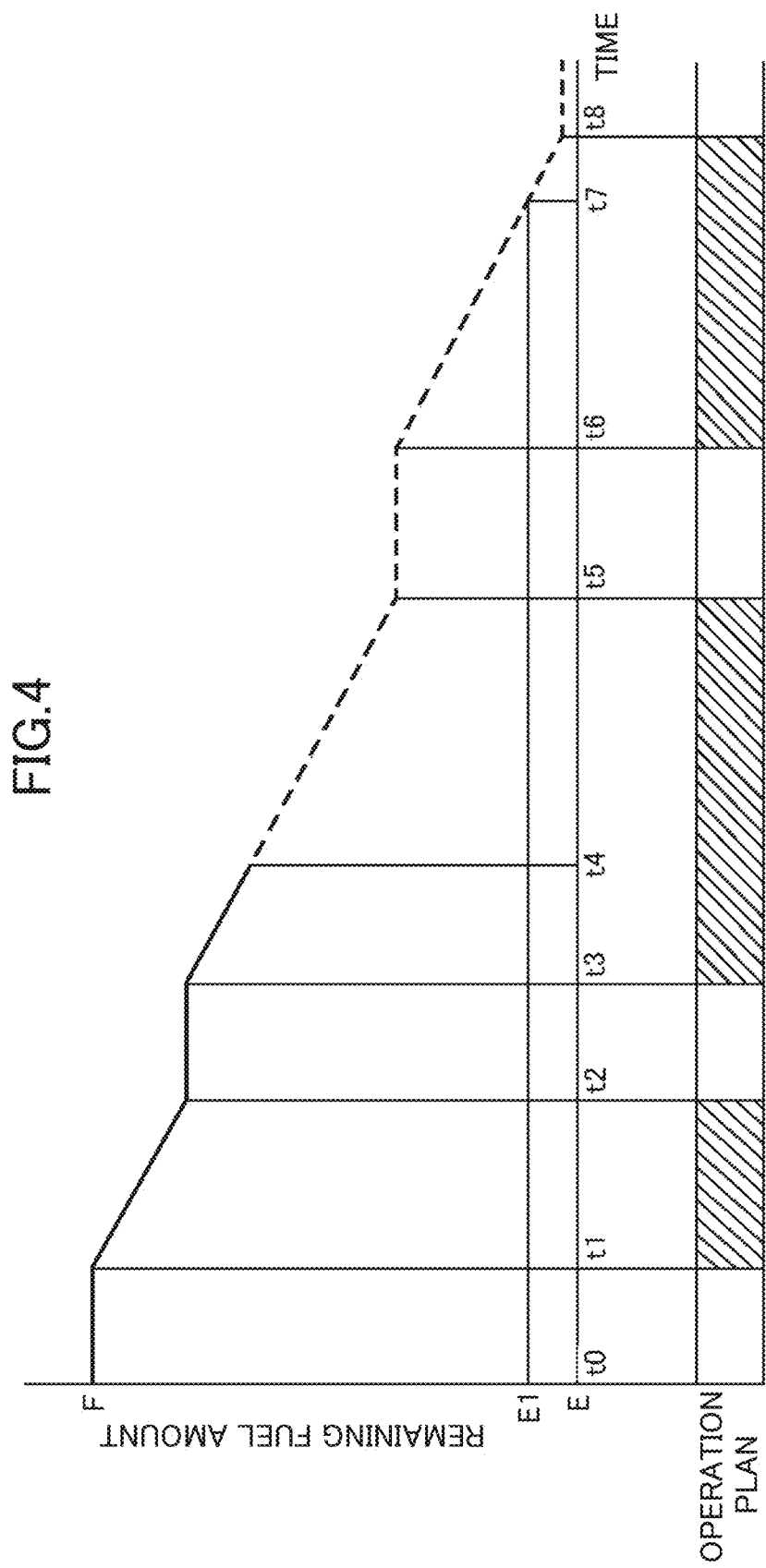

REMOTE FUEL MONITORING SYSTEM, VEHICLE-MOUNTED DEVICE, VEHICLE OR MACHINE, SERVER, REMOTE FUEL MONITORING METHOD, REMOTE FUEL MONITORING PROGRAM AND STORAGE MEDIUM

RELATED APPLICATIONS

The present application is a National Phase of International Application No. PCT/JP2018/035056 filed Sep. 21, 2018.

TECHNICAL FIELD

Embodiments of the present invention relates to a remote fuel monitoring system, a vehicle-mounted device, a vehicle, a server, a remote fuel monitoring method, a remote fuel monitoring program and storage medium for a vehicle or a machine provided with a vehicle-mounted device, particularly for a vehicle or a machine that cannot run on public roads.

BACKGROUND ART

In order to supply fuel for vehicles or machines that cannot run on public roads such as construction machines (for example, bulldozers, excavators, cranes or the like), agricultural machines (for example, cultivators, rice transplanters or the like), or generators (for example, generators for construction sites), it is necessary to transport fuel to the working site of these vehicles or machines by a refueling vehicle or the like. If the fuel of these vehicles or machines runs out, it will not be possible to work with the corresponding vehicle at the working site. Therefore, it is necessary to check the remaining fuel amount of these vehicles or machines and arrange a refueling vehicle before the fuel runs out.

For example, if multiple construction machines are used at a construction site, the refueling vehicle is arranged once or multiple times a day to refuel each construction machine. In the conventional method of arranging the refueling vehicle, the manager visually confirms the remaining fuel amount of each construction machine, determines refueling amount necessary for each construction machine according to the construction plan and instructs a fuel supply office to refuel construction machines. Therefore, working load on the manager is heavy and it is difficult to determine appropriate refueling amount for all construction machines. In addition, when refueling, each construction machine is refueled in turn by refueling amount determined in advance, so that it is necessary to suspend the work at the working site due to the refueling for each construction machine.

On the other band, for example, the fuel supply service providing system of Patent Literature 1 is an attempt to simplify the arrangement of refueling. In Patent Literature 1, it is disclosed that the remaining fuel amount of the contracted vehicle is automatically measured, information of the remaining fuel amount is transmitted to a service application system via a communication device, and when the remaining fuel amount becomes equal to or less than a predetermined value in a system using this service, a refueling instruction output request for refueling the contracted vehicle is output, and the manager gives a refueling instruction to the refueling vehicle for refueling the contracted vehicle based on the refueling instruction output request.

CITATION LIST

Patent Literature

Patent Literature 1: Japanese Patent Laid-Open No. 2009-282838

SUMMARY OF INVENTION

Technical Problem

When the system of Patent Literature 1 is used at a construction site, the operating status of each construction machine and the construction plan are not taken into consideration, and refueling instructions are given to each construction machine at different timings. Therefore, it is difficult to make an appropriate refueling plan. Further, in Patent Literature 1, it is premised that the fuel mounted on the refueling vehicle is sufficient for the refueling amount required by the contracted vehicle. Therefore, it is only considered that the contracted vehicle is fully refueled, and the refueling amount for the contracted vehicle cannot be estimated in advance. On the other hand, at the construction site, sometimes it is not possible to secure enough fuel to fully refuel all the construction machines with one refueling. In those cases, the refueling amount for each construction machine needs to be appropriately determined. However, in the system of Patent Literature 1 cannot meet such need. Further, the system of Patent Literature 1 does not consider that it is necessary to shorten the non-working time as much as possible due to the refueling all the construction machines.

In view of these conventional problems, the subject of embodiments of the present application is to provide a remote fuel monitoring system, a vehicle-mounted device, a vehicle or a machine, a server, a remote fuel monitoring method, a remote fuel monitoring program and a storage medium that can remotely monitor a remaining fuel amount, in a vehicle or a machine and make an appropriate refueling plan for each vehicle or machine according to situations.

Solution to Problem

The above subject of embodiments of the present invention can be achieved by the following configurations. That is to say, a remote fuel monitoring system of the first aspect of the present invention consists of:

a vehicle-mounted device for acquiring vehicle information including a remaining fuel amount of a vehicle or a machine; and a server for monitoring the remaining fuel amount of the vehicle or the machine based on the vehicle information received from the vehicle-mounted device, for calculating a refueling plan including refueling time and a refueling amount for the vehicle or the machine, and for outputting a refueling command based on the refueling plan for the vehicle or the machine to a refueling means, and characterized in that the server includes an input means for inputting the vehicle information acquired by the vehicle-mounted device, a storage means for storing information regarding the vehicle or the machine, an analyzing means for analyzing information regarding the remaining fuel amount of the vehicle or the machine based on the vehicle information and the information stored in the storage means, a refueling plan calculation means for calculating the refueling plan for the vehicle or the machine by using the information regarding the remaining fuel amount analyzed by the analyzing means, and an output means for outputting the refueling plan for the vehicle or the machine to the refueling means.

Further, a remote fuel monitoring system of the second aspect of the present invention is characterized in that, in the remote fuel monitoring system of the first aspect, the vehicle-mounted device is common regardless of the type of the vehicle or the machine.

Further, a remote fuel monitoring system of the third aspect of the present invention is characterized in that, in the remote fuel monitoring system of the first or second aspect, the vehicle information includes operation information of the vehicle or the machine, and the operation information is taken into consideration in the analysis of the remaining fuel amount in the analyzing means.

Further, a remote fuel monitoring system of the fourth aspect of the present invention is characterized in that, in the remote fuel monitoring system of any one of the first to third aspects, the information stored in the storage means includes information regarding an operation schedule of the vehicle or the machine.

Further, a remote fuel monitoring system of the fifth aspect of the present invention is characterized in that, in the remote fuel monitoring system of any one of the first to fourth aspects, the analysis of the remaining fuel amount or the calculation of the refueling plan is performed by learning in the analyzing means and/or the refueling plan calculation means.

Further, a remote fuel monitoring system of the sixth aspect of the present invention is characterized in that, in the remote fuel monitoring system of any one of the first to fifth aspects, the analyzing means predicts time when the remaining fuel amount becomes equal to or less than a predetermined amount.

Further, a remote fuel monitoring system of the seventh aspect of the present invention is characterized in that, in the remote fuel monitoring system of any one of the first to sixth aspects, the refueling plan includes a schedule for refueling the vehicle or the machine.

Further, a remote fuel monitoring system of the eighth aspect of the present invention is characterized in that, in the remote fuel monitoring system of any one of the first to seventh aspects, the server further outputs to a user terminal at least any one information of:

the vehicle information, the information stored in the storage means, the information regarding the remaining fuel amount analyzed by the analyzing means, or the information regarding the refueling plan calculated in the refueling plan calculation means.

Further, a remote fuel monitoring system of the nineth aspect of the present invention is characterized in that, in the remote fuel monitoring system of any one of the first to eighth aspects, the vehicle information includes a refueling amount by the refueling means, and the server can grasp the refueling amount to the vehicle or the machine.

Further, a remote fuel monitoring system of the tenth aspect, of the present invention is characterized in that, in the remote fuel monitoring system of any one of the first to nineth aspects, the server notifies a theft of fuel from the vehicle or the machine.

Further, a vehicle-mounted device of the eleventh aspect of the present invention which is used for remote fuel monitoring, is for acquiring vehicle information including a remaining fuel amount of a vehicle or a machine, and for transmitting the vehicle information to a server that monitors the remaining fuel amount of the vehicle or the machine based on the vehicle information, calculates a refueling plan including refueling time and a refueling amount for the vehicle or the machine and outputs a refueling command based on the refueling plan for the vehicle or the machine to a refueling means, and is characterized in that the vehicle-mounted device is connected to wiring of a remaining fuel amount detector provided in the vehicle or the machine, detects an analog value or a digital value related to the remaining fuel amount, and transmits the vehicle information, which includes the detected value as information regarding the remaining fuel amount, to the server.

Further, a vehicle-mounted device of the twelfth aspect of the present invention is characterized in that, in the vehicle-mounted device of the eleventh aspect, the vehicle-mounted device is common regardless of the type of the vehicle or the machine.

Further, a vehicle-mounted device of the thirteenth aspect of the present invention is characterized in that, in the vehicle-mounted device of the eleventh or twelfth aspect, the vehicle information includes operation information a the vehicle or the machine.

Further, a vehicle or a machine of the fourteenth aspect of the present, invention is characterized in that, the vehicle or the machine includes the vehicle-mounted device of any one of the eleventh to thirteenth aspects.

Further, a server of the fifteenth aspect of the present invention, which is used for remote fuel monitoring, is for monitoring a remaining fuel amount of a vehicle or a machine based on vehicle information that includes the remaining fuel amount of the vehicle or the machine and is received from a vehicle-mounted device that acquires the vehicle information, for calculating a refueling plan including refueling tune and a refueling amount for the vehicle or the machine, and for outputting a refueling command based on the refueling plan for the vehicle or the machine to a refueling means, and is characterized in that the server includes an input means for inputting the vehicle information acquired by the vehicle-mounted device, a storage means for storing information regarding the vehicle or the machine, an analyzing means for analyzing information regarding the remaining fuel amount of the vehicle or the machine based on the vehicle information and the information stored in the storage means, a refueling plan calculation means for calculating the refueling plan for the vehicle or the machine based on the information regarding the remaining fuel amount analyzed by the analyzing means, and an output means for outputting the refueling plan for the vehicle or the machine to the refueling means.

Further, a remote fuel monitoring method of the sixteenth aspect of the present invention is for monitoring a remaining fuel amount of a vehicle or a machine based on vehicle information that includes the remaining fuel amount of the vehicle or the machine and is received from a vehicle-mounted device that acquires the vehicle information, for calculating a refueling plan including refueling time and a refueling amount for the vehicle or the machine, and for outputting a refueling command based on the refueling plan for the vehicle or the machine to a refueling means, and is characterized in that the remote fuel monitoring method includes an input means for inputting the vehicle information acquired by the vehicle-mounted device, an analyzing means for analyzing information regarding the remaining fuel amount of the vehicle or the machine based on information regarding the vehicle or the machine stored in a storage means and the vehicle information, a refueling plan calculation means for calculating the refueling plan for the vehicle or the machine based on the information regarding the remaining fuel amount analyzed by the analyzing means, and an output means for outputting the refueling plan for the vehicle or the machine to the refueling means.

Further, a remote fuel monitoring program of the seventeenth aspect of the present invention is characterized in that the remote fuel monitoring program is capable of operating each of the means in the remote fuel monitoring method of the sixteenth aspect with a computer.

Further, a storage medium of the eighteenth aspect of the present invention is characterized in that the storage medium stores the remote fuel monitoring program of the seventeenth aspect.

Advantageous Effects of Invention

According to the remote fuel monitoring system of the first aspect of the present invention, it is possible to provide a remote fuel monitoring system that remotely monitors a remaining fuel amount of a vehicle or a machine and can make an appropriate refueling plan for each of the vehicle or the machine according to situations.

According to the remote fuel monitoring system of the second aspect of the present invention, it is possible to use a common vehicle-mounted device regardless of the type of the vehicle or the machine. Thus, it is not necessary to separately prepare a plurality of types of vehicle-mounted devices that are different for each type of the vehicle or machine. Therefore, versatility is improved and costs can be reduced.

According to the remote fuel monitoring system of the third aspect of the present invention, it is possible to analyze information regarding the remaining fuel amount of the vehicle or the machine with taking into consideration operation information of the vehicle or the machine.

According to the remote fuel monitoring system of the fourth aspect of the present invention, it is possible to analyze the information regarding the remaining fuel amount of the vehicle or the machine with taking into consideration information regarding an operation schedule a the vehicle or the machine.

According to the remote fuel monitoring system of the fifth aspect of the present invention, it is possible to appropriately analyze the remaining fuel amount according to situations of the vehicle or the machine and appropriately calculate the refueling plan by learning.

According to the remote fuel monitoring system of the sixth aspect of the present invention, it is possible to predict time when the remaining fuel amount becomes equal to or less than a predetermined amount. Thus, it is possible to reliably prevent fuel shortage and notify that the remaining fuel amount is low.

According to the remote fuel monitoring system of the seventh aspect of the present invention, it is possible to calculate a refueling schedule for the vehicle or the machine. Thus, it is possible to appropriately manage the refueling time for each of the vehicle or the machine and shorten the non-working time for the refueling at a working site. Further, by adjusting the refueling schedule for each of the vehicle or the machine, it is also possible to refuel each of the vehicle or the machine while continuing the work at the working site.

According to the remote fuel monitoring system of the eighth aspect of the present invention, it is possible to output to a user terminal at least any one information of the vehicle information, the information stored in the storage means, the information regarding the remaining fuel amount analyzed by the analyzing means, or the information regarding the refueling plan calculated in the refueling plan calculation means, so that it is possible to provide these information for the user. For example, the information regarding the remaining fuel amount analyzed by the analyzing means includes notification of time when the remaining fuel amount becomes equal to or less than a predetermined amount.

According to the remote fuel monitoring system of the nineth aspect of the present invention, it is possible to grasp a refueling amount for the vehicle or the machine. Thus, it is possible to record information of the refueling amount for each of the vehicle or the machine. Therefore, it is possible to use these records for fuel tax applications such as reduction and exemption applications for fuel tax.

According to the remote fuel monitoring system of the tenth aspect of the present invention, it is possible to notify a theft of fuel from the vehicle or the machine. Thus, using this notification can contribute a countermeasure against thefts of fuel from the vehicles or the machine.

According to the vehicle-mounted device of the eleventh aspect of the present invention, it is possible to provide a vehicle-mounted device that remotely monitors a remaining fuel amount of a vehicle or a machine and can make an appropriate refueling plan for each of the vehicle or the machine according to situations.

According to the vehicle-mounted device of the twelfth aspect of the present invention, it is possible to use a common vehicle-mounted device regardless of the type of the vehicle or the machine. Thus, it is not necessary to separately prepare a plurality of types of vehicle-mounted devices that are different for each type of the vehicle or machine. Therefore, versatility is improved and costs can be reduced.

According to the vehicle-mounted device of the thirteenth aspect of the present, invention, by acquiring operation information of the vehicle or the machine with the vehicle-mounted device, it is possible to analyze information regarding the remaining fuel amount of the vehicle or the machine with taking into consideration operation information of each of the vehicle or the machine.

According to the vehicle or the machine of the fourteenth aspect of the present invention, it is possible to provide a vehicle or a machine achieving the same effects as in the vehicle-mounted device of the eleventh to thirteenth aspects.

According to the server of the fifteenth aspect of the present invention, it is possible to provide a server for remote fuel control that remotely monitors a remaining fuel amount of a vehicle or a machine and can make an appropriate refueling plan for each of the vehicle or the machine according to situations.

According to the remote fuel monitoring method of the sixteenth aspect of the present invention, it is possible to provide a remote fuel monitoring method that remotely monitors a remaining fuel amount of a vehicle or a machine and can make an appropriate refueling plan for each of the vehicle or the machine according to situations.

According to the remote fuel monitoring program of the seventeenth aspect of the present invention, it is possible to provide a remote fuel monitoring program achieving the same effects as in the remote fuel monitoring method of the sixteenth aspect.

According to the storage medium of the eighteenth aspect of the present invention, it is possible to provide a storage medium storing the remote fuel monitoring program of the seventeenth aspect.

BRIEF DESCRIPTION OF DRAWINGS

FIG. 4 is an explanatory diagram of remaining fuel amount prediction.

DESCRIPTION EMBODIMENTS

Hereinafter, a remote fuel monitoring system, a vehicle-mounted device, a vehicle or a machine, a server, a remote fuel monitoring method, a remote fuel monitoring program, and a storage medium according to embodiments of the present invention will be described with reference to drawings. However, each embodiment described below is only for exemplifying a remote fuel monitoring system, a vehicle-mounted device, a vehicle or a machine, a server, a remote fuel monitoring method, a remote fuel monitoring program, and a storage medium for embodying the technical concept of the present invention. Thus, embodiments of the present, invention are not, limited thereto, and can be equally applied to those of other embodiments included in the claims.

First Embodiment

Figure 1:
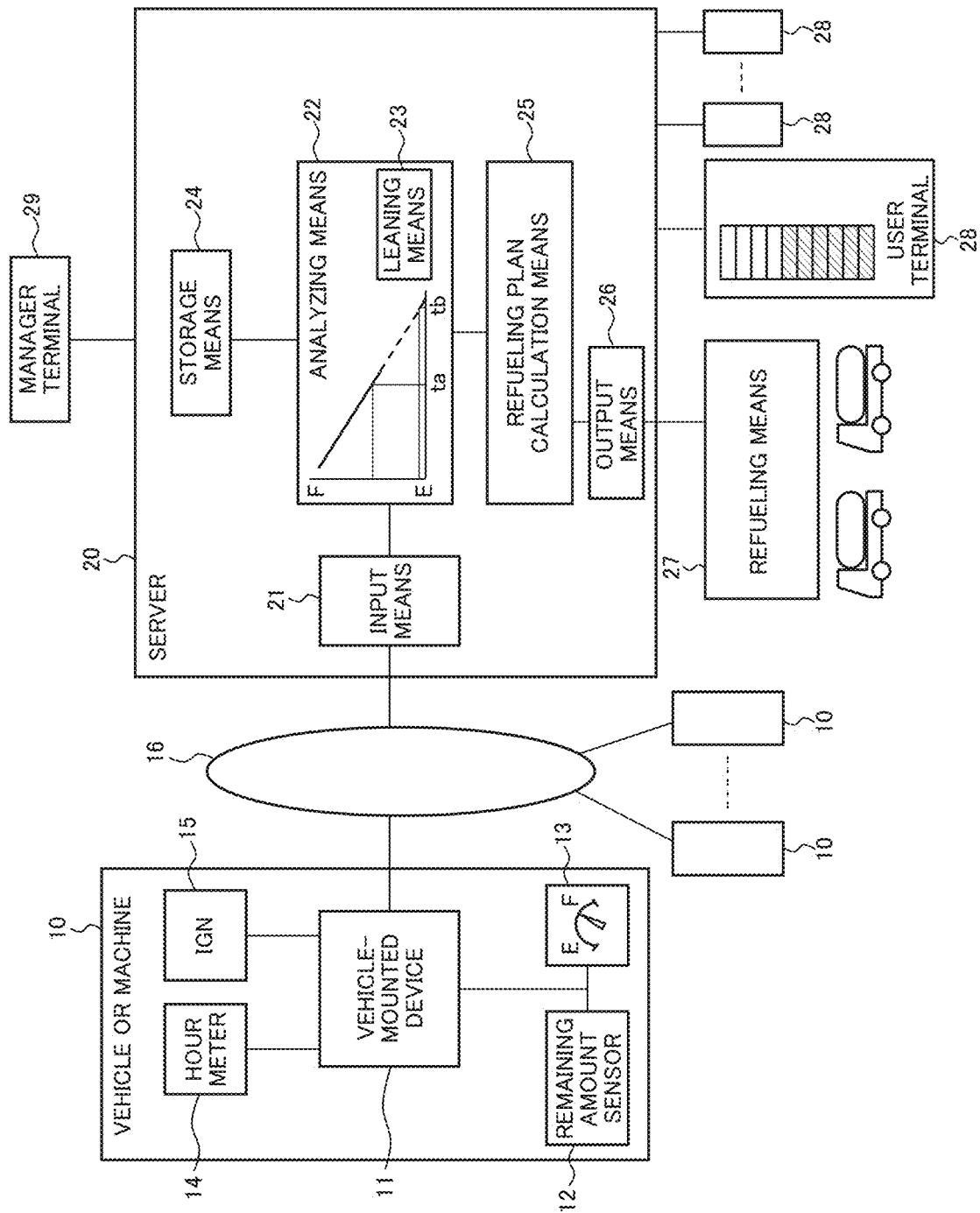
FIG. 1 is an overall diagram of a remote fuel monitoring system.

The credit examination support system according to the first embodiment will be described with reference to FIGS. 1 to 4. FIG. 1 is an overall view of a remote fuel monitoring system. A vehicle-mounted device 11 is installed in a vehicle or a machine 10. The vehicle or the machine 10 is not particularly limited, but is assumed to be unable to run on public roads, and includes construction machines, agricultural machines, generators and the like. Examples of construction machines include crawler vehicles, backhoes, cranes, excavators, bulldozers, pile drivers, boring machines, road rollers and the like. In addition, examples of agricultural machines include crawler vehicles, cultivators, rice transplanters, combine harvesters and the like. Although some of these can run on public roads as small-sized special motor vehicles or large-sized special motor vehicles, there is an advantage in refueling at the working place using a refueling vehicle because it is not preferable from the viewpoint of work efficiency to leave the working place for refueling. Generators are necessary for securing electric power at construction sites, and most of them are fixed type excepting power supply cars. Thus, refueling using a refueling car for these generators is required. The vehicle or the machine 10 arranged at an event site or the like is also a kind of vehicles that does not move from the event site, and the refueling vehicle refuels the vehicle or the machine 10 at the event site.

The vehicle-mounted device 11 is connected so that a fuel meter input signal, which is output from a remaining fuel amount sensor 12 and input to a fuel meter 13, is input, thereto. The vehicle-mounted device 11 is also connected to an hour meter 14, an ignition line (IGN) 15 and the like, and can collect information such as the remaining fuel amount, a refueling amount and operation information. The operation information is not particularly limited, and examples thereof include GPS position information, speed information, rotation number information, tachometer information, data recorder information, various operation information and the like.

One vehicle-mounted device 11 is installed in one vehicle. The installation location of the vehicle-mounted device 1 on the vehicle may be any location in the vehicle. If the vehicle-mounted device 1 is an add-on part, it can be installed at a place easy to access for installation such as under the passenger's seat, in the lower portion of the engine compartment or the inside of the instrument panel. Alternatively, the vehicle-mounted device 1 may be built in beforehand during manufacturing of the vehicle 2.

The wiring of the vehicle-mounted device 11 can be directly connected without passing through vehicle-mounted LAN. For example, the vehicle-mounted device 11 can be directly connected to the wiring that is output from the remaining fuel amount sensor 12 and input to the fuel meter 13. The hour meter 14 and the ION 15 can also be directly connected to the vehicle-mounted device 11. If the wiring of the vehicle-mounted device 11 is directly connected without passing through the vehicle-mounted LAN, for example, problems relating to the security vulnerability in the controller area network (CAN), which is widely used as a vehicle-mounted control network, can be solved by a simple means.

On the other hand, the vehicle-mounted device 11 can use a data communication module (hereinafter referred to as "DCM") and connects the DCM to various vehicle-mounted ECUs via the vehicle-mounted LAN to acquire vehicle information including the remaining fuel amount, the refueling amount, the operation information and the like.

As the vehicle-mounted device 11, a common vehicle-mounted device can be used regardless of the type of the vehicle or the machine 10. The capacity of the tank, the display of the fuel gauge (analog, digital, etc.) and the like vary depending on the specifications of the vehicle or the machine 10. Even if the specifications are different in this way, for example, if the vehicle-mounted device 11 is directly connected without passing through the vehicle-mounted LAN, by providing a plurality of input terminals, an AD converter and the like in the vehicle-mounted device 11, common and highly versatile vehicle-mounted device can be used. Further, it is possible to appropriately predict the remaining fuel amount by learning, for example by machine learning, in the server 20 as described later. Further, since the data of the remaining fuel amount can be automatically acquired by the vehicle-mounted device 11, it is not necessary for the manager to visually check the display of each fuel gauge of the vehicle or the machine 10. Therefore, labor saving can be achieved.

The server 20 is provided with an input means 21, and the input means 21 can receives the vehicle information from the vehicle-mounted device 11 provided in one or more vehicles or machines 10 via a wireless communication network 10. The server 20 can be, for example, a cloud server. The wireless communication network 16 may be in any forms, for example, 2G, 3G, 4G, 5G, Wi-Fi (registered trademark), WiMAX (registered trademark), wireless LAN, beacon, Bluetooth (registered trademark), ZigBee (registered trademark), V2X, other dedicated lines or the like. The vehicle information received by the input means 21 is used in the server 20 for monitoring the remaining fuel amount, predicting time when the remaining fuel amount becomes equal to or less than a predetermined amount, analyzing the remaining fuel amount by learning, calculating a refueling plan including the fuel refueling time and the refueling amount, calculating a refueling schedule, calculating fuel consumption efficiency, calculating an operation schedule of the vehicle or the machines 10, detecting abnormalities such as a theft at fuel or the like.

The vehicle information received by the input means 21 is input to an analyzing means 22. In the analyzing means 22, the remaining fuel amount is analyzed by learning from the vehicle information or the like by a learning means 23 as described later. The vehicle information includes operation information of the vehicle or the machine 10 (for example, information of the hour meter or information from the IGN) and a storage means 24 stores the operation schedule of the vehicle or the machine 10. These information are used for the analysis of the remaining fuel amount in the analyzing means 22. The analyzing means 22 grasps increase/decrease data of fuel (upper limit value, lower limit value, value for notifying refueling and the like) with respect to time, analyzes the fuel upper limit value, the fuel lower limit value and the remaining fuel amount by learning, monitors the remaining fuel amount, predicts time when the remaining fuel amount becomes equal to or less than a predetermined amount, calculates the fuel consumption efficiency and detects abnormalities such as a theft of fuel or the like. Information on the specifications of each vehicle or machine 10 is stored in the storage means 24. In the analysis of the remaining fuel amount by the analyzing means 22, by using the information on the specifications including the capacity of the fuel tank, not only ratio (percentage) of the remaining fuel amount but also specific capacity (liter) can be grasped.

The analysis result of the remaining fuel amount by the analyzing means 22 is used for the refueling plan calculation in the refueling plan calculation means 25. The refueling plan calculation means 25 grasps the refueling priority and the refueling amount of each vehicle or machine 10, the total refueling amount and the like, and also takes into consideration the operation schedule of the vehicle or the machine 10 stored in the storage means 24 and calculates the refueling plan including the refueling amount and the refueling schedule of each vehicle or machine 10. A result of predicting time when the remaining fuel amount becomes equal to or less than a predetermined amount and detection of an abnormality such as a theft of fuel or the like are notified to, for example, a management terminal 29 and a user terminal 28. The refueling plan calculated in the refueling plan calculation means 25 is output to a refueling means 27 via an output means 26. The refueling means 27 is a gas station, a fuel vendor or the like. On the bases of the refueling plan output from the output means 26, a refueling vehicle is arranged at the working place of the vehicle or the machine 10 and supplies a predetermined amount of fuel for each vehicle or machine 10 according to the predetermined schedule (the refueling plan).

When the vehicle or the machine 10 is refueled by the refueling vehicle, the data of the refueling amount is detected by the vehicle-mounted device 11 and transmitted to the analyzing means 22 of the server 20, so that the analyzing means 22 can grasp the refueling amount of each vehicle or machine 10. In order to apply for tax reduction on eco-fuel, it is necessary to record how much refueling was performed on each vehicle and machine. Since these data are grasped by the analyzing means 22, the working load on the manager for tax reduction application is also greatly improved.

The user terminal 28 can receive information based on monitoring the remaining fuel amount calculated, predicting time when the remaining fuel amount becomes equal to or less than a predetermined amount, analyzing the remaining fuel amount by learning, calculating the refueling plan including the fuel refueling time and the refueling amount, calculating the refueling schedule, calculating fuel consumption efficiency, calculating operation schedule of the vehicle or the machine 10 and the like in the server 20. The user terminal 28 preferably has a display device, and examples thereof include a personal computer (hereinafter referred to as "PC"), a tablet terminal, a smartphone, a mobile phone, another dedicated terminal and the like. For example, the user terminal digitally displays the remaining fuel amount of the selected vehicle or machine 10, for example, in the 10 stages display. In this way, it is possible to display the remaining fuel amount in an easy-to-understand and unified manner without depending on the specifications of the fuel gauge of the vehicle or the machine 10. At the same time, time when the amount of fuel becomes equal to or less than a predetermined amount and abnormalities such as a theft of fuel or the like are notified. For communication between the server 20 and the user terminal 28, the same communication means as the above-mentioned wireless communication network 16 can be used.

The management terminal 29 preferably monitors the remaining fuel amount in all the vehicles or the machines 10, makes settings for various calculations on the server 20 (setting of operation schedule of the vehicle or the machine 10, setting of the analyzing means 22, refueling plan calculation means 25 or the like, and the like), displays and confirms the calculation result, and has a display device. For example, a PC, a tablet terminal, a smartphone, a mobile phone or the like can be used. For example, the manager can approve the operation schedule stored in the storage means 24 and approve the refueling plan from the refueling plan calculation moans 25 by using the management terminal 29. In addition, the manager monitors the remaining fuel amount of all the vehicles or the machines, makes settings for various calculations on the server 20, confirms the calculation result in the analyzing means 22 and the refueling plan calculation means 25, and performs a part of these calculations by using the management terminal 29. For example, the final refueling plan can be validated after obtaining permission from the management terminal 29 and transmitted from the output means 26 to the refueling means 27. In the management terminal 29, it is possible to monitor detailed data regarding the calculation in the server 20. Further, if the management terminal 29 performs a part of the calculation to be calculated in the analyzing means 22 and the refueling plan calculation means 25, the refueling plan that reflects the sense of the manager can be made. However, on the other hand, the working load on the manager increases. Therefore, if the management terminal 29 performs a part of the calculation to be calculated in the analyzing means 22 and the refueling plan calculation means 25, or if the management terminal 29 monitors detailed data regarding the calculation in the server 20, it is desirable to consider the working load on the manager and determine the content of the calculation.

[Remaining Fuel Amount Sensor 12]

Figure 2:
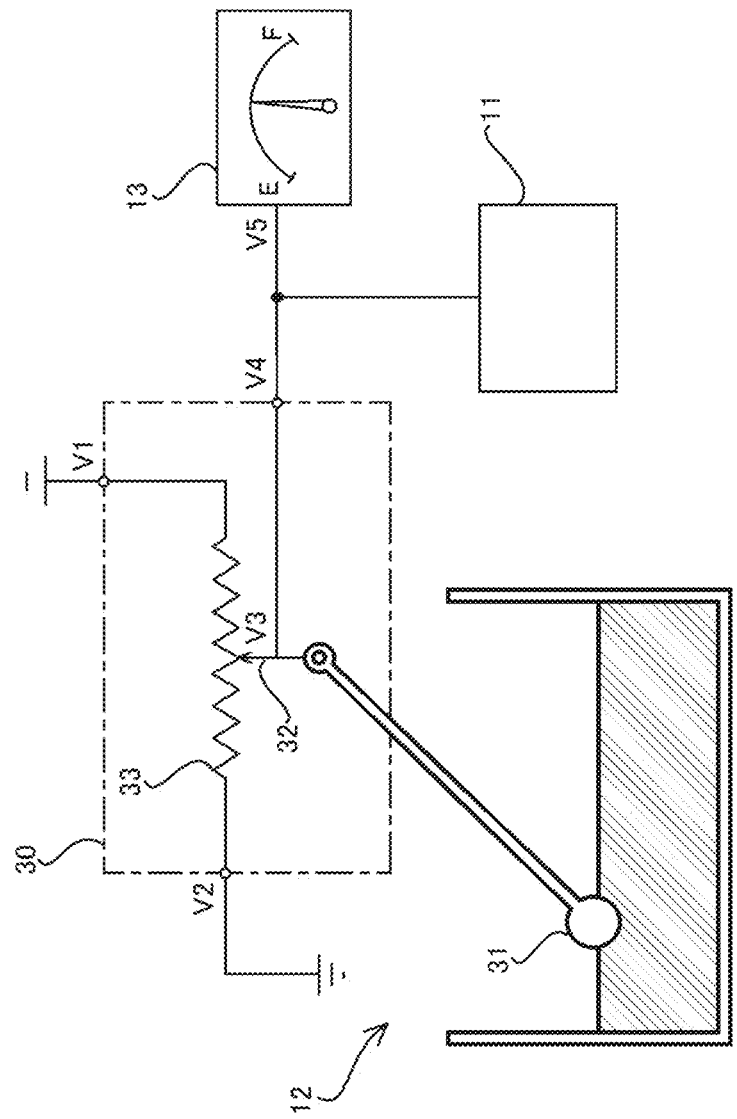
FIG. 2 is a conceptual diagram of an example of a remaining fuel amount sensor.

FIG. 2 is a conceptual diagram of an example of the remaining fuel amount sensor 12. The remaining fuel amount sensor 12 consists of a liquid level detecting circuit 30 and a float 31. The vehicle or the machine 10 is provided with the float 31 that is movable according to the remaining amount of the fuel tank. A sliding piece 32 slidingly moves with respect to a resistor 33 in conjunction with the movement of the float 31. That is, when the float 31 moves up and down according to the height of the liquid level of the fuel tank, a contact V3 between the resistor 33 and the sliding piece 32 moves between the right end and the left end of the resistor. For example, when there is much fuel and the float is high, the sliding piece 32 is located on the right side of the resistor 33, and when then is low fuel and the float is low, the sliding piece 32 is located on the left side of the resistor 33. The right end of the resistor 33 is connected to a power supply voltage (direct current positive voltage) via a terminal V1, and the left end of the resistor 33 is grounded via a terminal V2. The contact V3 is connected to a detection circuit output terminal V4, and the detection circuit output terminal V4 is connected to the fuel meter 13 provided in the vehicle or the machine 10 via a terminal V5.

The vehicle-mounted device 11 is connected to wiring from the detection circuit output terminal V4 to the terminal V5 of the fuel meter 13. Therefore, the voltage detected by the vehicle-mounted device 11 is variable between the power supply voltage and the ground potential, and when there is much fuel and the float is high, the contact V3 is located on the right side of the resistor 33 and high voltage is detected by the vehicle-mounted device 11. When there is low fuel and the float is low, the contact V3 is located on the left side of the resistor 33, and low voltage is detected by the vehicle-mounted device 11.

Since the specifications of the liquid level detecting circuit 30 and the fuel meter vary depending on the specifications of the vehicle or the machine 10, the voltage value or current value detected by the vehicle-mounted device 11 varies depending on the specifications of the vehicle or the machine 10. The vehicle-mounted device 11 is provided with a plurality of input terminals and a built-in A/D converter and is configured to be able to detect a voltage value or a current value in a wide range even if the specifications of the vehicle or the machine 10 vary. Further, if the liquid level detecting circuit 30 is designed to output digital values, the digital values can be detected by a digital input terminal provided in the vehicle-mounted device 11. Even if the specifications of the data acquired by the vehicle-mounted device 11 vary depending on the specifications of the vehicle or the machine 10, the remaining fuel amount of each vehicle or machine 10 can be analyzed by the analyzing means 22 described later.

[Learning Means 23]

Figure 3:
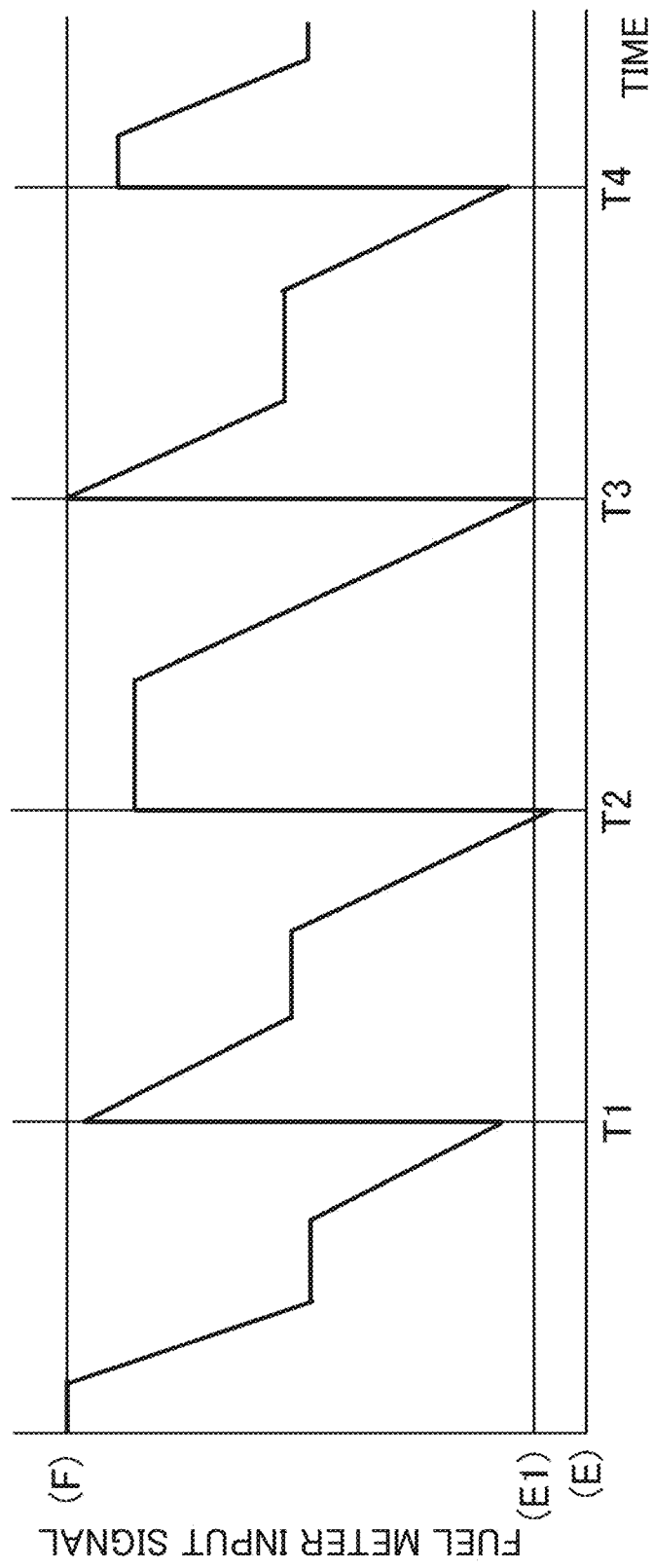
FIG. 3 is an explanatory diagram of a leaning means.

FIG. 3 is an explanatory diagram of the learning means 23. FIG. 3 is only an example, and this graph varies depending on the specifications of each vehicle or machine 10. The vehicle information acquired by the vehicle-mounted device 11 is transmitted to the analyzing means 22 via the input means 21. The analyzing means 22 analyzes the remaining fuel amount of each vehicle or machine 10 by using the learning means 23. The vertical axis of FIG. 3 is the fuel meter input signal which corresponds to the value of the detection circuit output terminal V4 of FIG. 2, (F) indicates full fuel, (E) indicates zero fuel, and (E1) indicates a refueling notification remaining amount. The horizontal axis of FIG. 3 is time, and T1, T2, T3, and T4 indicate refueling time. Here, an example in which T1, T2, T3, and T4 are substantially constant intervals is shown, but the refueling interval in the actual working site is not always constant.

At the origin, the fuel is (F) full, but the fuel decreases according to the working time, and at time T1, the fuel is replenished to near full. The period from time 0 to T1 expressed with a line parallel to the horizontal axis is the time when the fuel does not decrease, and means the time when the vehicle or the machine 10 is not working. Although omitted in FIG. 3, in the learning means 23, the vehicle information including the operation information is taken into consideration. Therefore, the tune zone in which the vehicle is in a possible state can be grasped by the information from the hour meter and IGN. Therefore, the fuel consumption efficiency (that is the fuel consumption amount per unit operating time) of the corresponding vehicle or machine 10 can be calculated from the slope of the graph. For example, compared with the operating status of engines of vehicles running on public roads, the operating status of hydraulic pumps (many construction machines are hydraulically movable) tends to have relatively small load fluctuations and the analysis result of the fuel consumption efficiency tends to be close to linear. In the analysis in the learning means 23, it is possible to approximately calculate the fuel consumption efficiency by using this linear feature.

In order to calculate the fuel consumption efficiency more strictly, it is possible to perform an analysis according to the work content based on the vehicle information and the operation schedule stored in the storage means 24. For example, fuel consumption efficiency becomes had (that is, fuel is much consumed) during work with heavy load, and fuel consumption efficiency becomes good (that is, fuel is little consumed), during work with little load. If the fuel consumption efficiencies are different, the slopes of the graph in FIG. 3 are different. If the slopes of the graph are substantially uniform in FIG. 3, it is illustrated that the working load is substantially constant.

During the period from time T1 to T2, the fuel decreases according to the working time, and at time T2, the remaining fuel amount is lower than the refueling notification remaining amount (E1). In the period from time T2 to T3, it can be seen that the fuel does not decrease for a while from time T2 and the work was not performed. Further, at time T3, the fuel is replenished until the tank is full (F). From time T3 to T4, the fuel decreases according to the working time, and the fuel is replenished at the time T4. By analyzing such a process, from the values of the detection circuit output terminal V4 of FIG. 2 acquired by the vehicle-mounted device 11, the full fuel (F), the zero fuel (E), the refueling notification remaining amount (E1) and the like can be analyzed by learning, for example, by machine learning.

In the analysis in the learning means 23, it is possible to correspond to any specification regardless of the specification of the vehicle or the machine 10. Moreover, it is possible to perform more accurate fuel consumption efficiency calculation by taking into consideration the vehicle information. Further, in this analysis, it is not necessary to confirm the actual value of the fuel meter 13 of the vehicle or the machine 10, so that the working load on the manager can be significantly reduced. Further, information on the specifications of each vehicle or machine 10 is stored in the storage means 24. In the analysis of the remaining fuel amount by the learning means 23, by using the information on the specifications including the capacity of the fuel tank, not only ratio (percentage) of the remaining fuel amount but also specific capacity (liter) can be grasped.

[Remaining Fuel Amount Prediction (Analyzing Means 22)]

FIG. 4 is an explanatory diagram of the analyzing means 22. In the analyzing means 22, it is possible to predict the remaining fuel amount by using the analysis result in the learning means 23. The vertical axis of FIG. 4 is the remaining fuel amount, F is full fuel, E is zero fuel, and E1 is the refueling notification remaining amount. The horizontal axis of FIG. 4 is time, and t0 to t8 indicate predetermined time. Regarding the operation plan written below the horizontal axis, the operating time of the target vehicle or machine 10 is indicated by diagonal lines. Although this operation plan corresponds to the storage means 24, it is possible to use data that was corrected based on the operation information including the information of the hour meter, the IGN or the like acquired by the vehicle-mounted device 11. Using the corrected data, improves the accuracy of remaining fuel amount prediction.

The solid line graph (time t0 to t4) is measured value, and the broken line graph (time t4 or later) is predicted value by the analyzing means 22. From t0 to t1, the fuel is full (F) and the target vehicle or machine 10 is not in operation. From t1 to t2, since the target vehicle or machine 10 is in operation, the remaining fuel amount decreases with the passage of time. In FIG. 4, the characteristics of the remaining fuel amount are represented by a linear line. As described above, this is because, for example, in a hydraulically movable construction machine, the load fluctuation is relatively small and the analysis result of the fuel consumption efficiency tends to be close to linear. However, in the measured values from t0 to t4, for example, the fuel consumption efficiency may fluctuate depending on the work content, so that the remaining fuel amount does not always change linearly.

From t2 to t3, since the target vehicle or machine 10 is in operation, there is no change in the remaining fuel amount. From t3 to t5, since the target vehicle or in machine 10 is in operation, the remaining fuel amount, decreases. Here, from t3 to t4, the value is actually the measured value, but after t4, the value is the predicted value. This predicted value is calculated from the predicted fuel consumption efficiency, and in FIG. 4, the load is assumed to be constant, and the predicted value of the remaining fuel amount is calculated with the linear characteristic. From t5 to t6, since the target vehicle or machine 10 is not in operation on the operation schedule, the remaining fuel amount is predicted to be constant. From t6 to t8, since the target vehicle or machine 10 is in operation on the operation schedule, the predicted value of the remaining fuel amount is predicted to decrease, and in the case of FIG. 4, the predicted value of the remaining fuel amount is calculated with the linear characteristic. At t7, since the remaining fuel amount is to reach the refueling notification remaining amount E1, the time of the refueling notification remaining amount E1 can be grasped in advance, and the necessity of refueling can be early notified.

In the example of FIG. 4, the load on the vehicle or the machine 10 is assumed to be constant, and the predicted value of the remaining fuel amount is calculated with the linear characteristic, but this embodiment is not limited thereto. For example, if the work content is specified in the operation schedule, by assuming that the fuel consumption efficiency changes according to the load of the work content, it is possible to predict the remaining fuel based on the fuel consumption efficiency according to the scheduled work content. The operation plan in FIG. 4 has two values (time zone with diagonal line and time zone without diagonal line), that mean operating and non-operating. However, when considering the change in fuel consumption efficiency, the operation plan is expressed as a graph (vertical axis thereof is fuel consumption efficiency and horizontal axis thereof is time) that corresponds to the change in fuel consumption efficiency. The result predicted from FIG. 4 is used in the calculation of the fuel plan in the refueling plan calculation means 25.

[Refueling Plan Calculation Means 25]

Table 1 shows an example of the calculation of the refueling plan calculation means 25. In Table 1, the "vehicle number" indicates the case where the number of vehicles or machines 10 is 6 from A to F. The "remaining amount prediction" is the predicted value of the remaining fuel amount by the above-mentioned analyzing means 22 at a predetermined refueling time, and in Table 1, for explanation, there are four stages of "with sufficient margin", "with margin", "low", and "extremely low". However, the actual fuel prediction can be expressed in more detailed stages (for example, 10 stages display) or expressed by using the remaining fuel amount (in liter display or in percentage display). In these cases, a more detailed refueling plan calculation can be performed

TABLE 1

| vehicle number | remaining amount prediction | operating status at the time of refueling | refueling order | refueling time | refueling amount (L) |
|---|---|---|---|---|---|
| A | with sufficient margin | operating | 6 | h6 | a |
| B | extremely low | non-operating | 1 | h1 | b |
| C | low | operating | 3 | h3 | c |
| D | with margin | non-operating | 4 | h4 | d |
| E | low | non-operating | 2 | h2 | e |
| F | with margin | operating | 5 | h5 | f |
| | | | | | total T |

The "operating status at the time of refueling" is determined from an operating schedule stored in the storage means 24 at a predetermined refueling time, and is expressed by two values of "operating" and "non-operating" in Table 1. In the operation schedule, it is possible, to set degree of load according to the work content as "operating" and set information regarding the time zones of "operating" and "non-operating". In this case, since the "operating status at the time of refueling" is set in more detail, it is possible to calculate a more detailed refueling plan.

The "refueling order" is a refueling order calculated according to the "remaining amount prediction" and the "operating status at the time of refueling". The "refueling time" is the refueling time calculated in the refueling plan calculation means 25. Further, the "refueling amount" is calculated from the predicted value of the remaining fuel amount in the refueling plan calculation means 25 at a predetermined refueling time. "Total T" is a value obtained by totaling the refueling amount of each vehicle or machine 10.

In Table 1, the refueling order is calculated so that the vehicle with the lower remaining amount prediction has the higher priority of refueling, and the vehicle, in the non-operating status at the time of refueling suspended has the higher priority of refueling. That is, regarding the remaining amount prediction, B corresponding to "extremely low" has the highest priority for refueling, and C and E corresponding to "low" have the next highest priority, D and F corresponding to "with margin" have the further next highest priority and A corresponding to "with sufficient margin" has the lowest priority. Here, in the remaining amount prediction, the priority of C and E is the same, but when looking at the operating status at the time of refueling, E in non-operating is set to have a higher priority than C in operating. Further, in the remaining amount prediction, the priority a D and F is the same, but when looking at the operating status at the time of refueling, D in non-operating is set to have a higher priority than F in operating. As a result, in Table 1, the refueling order is B, E, C, D, F, A.

In actual use, in a case where a more detailed stage (for example, 10 stages display) or display of remaining fuel amount (in liter display or in percentage display) is used in the remaining amount prediction, and in a case where, in the operating status at the time of refueling, the degree of load can be set according to the work content or information of the time zones of "operating" and "non-operating" can be set, a more detailed refueling plan can be calculated. Even if there are many vehicles or machines 10, an appropriate refueling plan can be made.

The refueling amount is calculated for each vehicle or machine 10 based on the predicted value of the remaining fuel amount calculated in the analyzing means 22. Since the fuel load capacity of the refueling vehicle in the refueling means 27 is limited, one refueling may not be sufficient to fill all vehicles or machines 10. In this case, the refueling amount is set so that the total T is equal to or less than the upper limit of the fuel load capacity in the refueling vehicle.

Total $T \leq$ (upper limit of fuel load capacity in refueling vehicle)

That is, the refueling amount for each vehicle or machine 10 needs to be reduced to be less than the fully refueling amount. This reducing refueling amount is calculated in the refueling plan calculation means 25 or the analyzing means 22 according to the following factors. That is, the total amount of fuel that needs to be reduced with respect to the total T, the operating status of each vehicle or machine 10 until the next refueling time (that is determined from operation schedule stored in the storage means 24), the remaining amount prediction at the time of refueling of each vehicle or machine (that is the predicted value of the remaining fuel amount calculated in the analyzing means) and the like.

For example, the amount of fuel required for each vehicle or machine 10 is calculated and obtained according to the operating time scheduled until the next refueling time. The refueling amount required for each vehicle or machine 10 according to the operating time scheduled until the next refueling tune can be calculated in the analyzing means 22. In the example of FIG. 3, in the refueling at time T2, long non-operating time is predicted until the next refueling time T3. Thus, the refueling amount is set to be less than the full tank. On the other hand, in the refueling at time T3, a long operating time is predicted until the next refueling time T4. Thus, the refueling is set to be full. Further, if the vehicle or the machine 10 predicted to have low remaining fuel at the time of refueling each vehicle or machine 10 according to the remaining amount prediction is preferentially refueled, the efficiency of the refueling work as a whole is improved. Therefore, in calculating the refueling amount, it is desirable to consider the remaining amount prediction at the time of refueling.

Based on the refueling plan calculated in the refueling plan calculation means 25, the refueling means 27 arranges a refueling vehicle loaded with fuel corresponding to the total T or more at the working site where the vehicle or the machine 10 is working. Each vehicle or machine 10 is refueled according to the refueling order based on the calculated refueling schedule. In the refueling means, the operation of the refueling vehicle can be managed by using GPS. Geofence or the like, and the arrival time of the refueling vehicle can also be grasped at the working site. It is possible to shorten the waiting time of the vehicle or the machine 10 for refueling. The refueling timing is calculated from the refueling time in the operation schedule stored in the storage means 24, the refueling order and the refueling amount of each vehicle or machine 10, and the like.

Further, it is possible, to correct the refueling time in the operation schedule, stored in the storage means 24 based on the refueling plan calculated in the refueling plan calculation means 25. The refueling time is set as the refueling time in the operation schedule stored in the storage means 24 according to the progress of the work at the working site, the conditions of the refueling means and the like, but this refueling time may be changed depending on the actual progress of the work, the operation status of the refueling car and the like. In this case, there may be a gap between the originally planned refueling time and the refueling plan, and the waiting time of the vehicle or the machine 10 may be extended due to the refueling. Therefore, by adjusting the operation schedule stored in the storage means based on the actual progress of the work and the refueling plan based on the refueling plan calculation means, the effective refueling work can be realized based on the work plan consistent with the refueling plan. For example, if a refueling notification is issued to a certain vehicle or machine 10, the refueling schedule may be advanced, or a temporary refueling vehicle may be arranged as the refueling means 27 to refuel the vehicle at an appropriate time. Thereby it is possible to prevent the work of a specific vehicle or machine 10 from being suspended due to running out of fuel, so that the delay of the entire work schedule can be prevented and efficient work according to the work schedule can be performed.

The refueling means 27 uses a refueling vehicle to refuel each vehicle or machine 10 in a predetermined order and in a predetermined amount based on a refueling plan. The refueling amount can be grasped with the meter on the refueling vehicle side, but instead of this meter, or in addition to this meter, the refueling amount supplied to each vehicle or machine 10 can be grasped in the server 20 by using the information of the remaining fuel amount sensor acquired from the vehicle-mounted device 11. The refueling amount grasped by the server 20 can be displayed by using the user terminal 28, and this information can also be taken into consideration when refueling by the refueling vehicle in the refueling means 27. Further, as will be described in the second embodiment, the server can grasp the refueling amount of each vehicle or machine 10 and use it for preparing application documents for tax reduction on eco-fuel.

Also in the calculation in the refueling plan calculation means 25, it is possible to make an appropriate refueling plan by learning, for example, by machine learning. At the working site where the vehicle or the machine 10 is working, the manager may manually change the refueling plan at the beginning of refueling, but if the learning in the refueling plan calculation means 25 progresses, the appropriate refueling plan can be calculated automatically. At construction sites or the like, a construction period of two to three years may be scheduled, and the calculation of the refueling plan by learning with the refueling plan calculation means 25 is very effective.

[User Terminal 28]

The user terminal 28 can display the remaining fuel amount of the selected vehicle or machine 10 from each vehicle or machine 10 monitored by the analyzing means 22. At this time, the display mode can be unified for all vehicles or machines 10 regardless of the display mode of the fuel meter provided in the actual vehicle or machine 10. Therefore, the manager can easily grasp the remaining fuel amount of each vehicle or machine 10. The display mode dale remaining fuel amount in the user terminal 28 can be a digital display of several stages to 20 stages, for example, a digital display of 10 stages shown in FIG. 1. The display mode of the remaining fuel amount in the user terminal 28 can be an analog display, for example, a pointer type meter display.

Further, since the user terminal 28 can display the remaining fuel amount prediction result calculated in the analyzing means 22, it is possible to grasp the refueling notification timing and the like. Further, if a vehicle or a machine 10 has a low remaining fuel amount, the refueling notification is issued to the user terminal 28 after specifying the target vehicle or machine 10. Further, on the user terminal 28, it is possible to display the refueling plan from the refueling plan calculation means 25. Further, the user terminal 28 may display arbitrary information managed lay the server, and for example, it is possible to display the operation schedule stored in the storage means.

[Management Terminal 29]

The management terminal 29 monitors the remaining fuel amount the vehicles or the machines 10, makes settings for various calculations on the server 20 (setting of operation schedule of the vehicle or the machine 10, setting of the analyzing means 22, refueling plan calculation means 25 or the like, and the like), displays the calculation result. In the management terminal 29, in order to monitor the remaining fuel amount of all vehicles or machines 10, if the display mode of the remaining fuel amount of each vehicle or machine 10 is unified, it is easy for the manager to grasp the remaining fuel amount of each vehicle or machine 10. The management terminal 29 can manage the operation schedule stored in the storage means 24. The operation schedule is determined based on the work plan at the working site of the vehicle or the machine 10, but (1) correction according to the actual progress of work,
(2) correction based on the refueling plan calculated in the refueling means calculation means 25,
(3) correction based on the operation of the refueling vehicle of refueling means 27, and the like may be required. Therefore, the manager can manage the operation schedule by using the management terminal 29. Although the operation schedule can be corrected automatically, it is also possible to correct the management schedule after obtaining the approval of the manager. It is also possible for the manager to correct the operation schedule using the management terminal 29. Further, the refueling plan from the refueling plan calculation means 25 can be finally validated after obtaining the permission of the manager.

The remote fuel monitoring method of the present embodiment can be realized by a remote fuel monitoring program executed in the server, and the remote fuel monitoring program can be stored in an arbitrary storage medium.

Second Embodiment

The second embodiment is a method of grasping the refueling amount by using the remote fuel control system of the first embodiment and using it for preparing application documents for tax reduction on eco-fuel. With respect to FIGS. 1 to 4, the same reference numerals are used for the same configurations as in the first embodiment, and the description thereof will be omitted. As described in the first embodiment, the server 20 can grasp the refueling amount to each vehicle or machine 10 by the refueling vehicle of the refueling means 27. That is, in the server 20, the analyzing means 22 can accurately grasp when the fuel is replenished, which vehicle or machine 10 is replenished, and how much fuel is replenished.

In order to receive the tax reduction on eco-fuel, it is necessary to report all refueling information for each vehicle or machine 10, but conventionally, it has been difficult to grasp the refueling information for each vehicle or machine 10. In the present embodiment, since the server 20 accurately grasps the refueling information for each vehicle or machine 10, a report for tax reduction can be easily created from this refueling information, so that the working load on the manager is reduced. In addition, it is possible to apply for an appropriate eco-fuel tax reduction.

Third Embodiment

The third embodiment is a method of monitoring a theft of fuel from the vehicle or the machine 10 by using the fuel remote control system in the first or second embodiment. With respect to FIGS. 1 to 4, the same reference numerals are used for the same configurations as in the first or second embodiment, and the description thereof will be omitted. As described in the first or second embodiment, the vehicle information detected by the vehicle-mounted device, for example, the remaining fuel amount information of each vehicle or the machine 10, and the information of the hour meter and the IGN can be monitored by the server 20. That is, the analyzing means 22 monitors the change in the remaining fuel amount according to the operating status of the vehicle or the machine 10. If the theft of extracting fuel from the vehicle or the machine 10 occurs, the remaining fuel amount will decrease without depending on the operating status of the vehicle or the machine 10. Therefore, the analyzing means 22 can detect the theft of fuel from the vehicle or the machine 10 by monitoring the change in the remaining fuel amount according to the operating status of each vehicle or machine 10.

When the theft of fuel from the vehicle or the machine 10 is detected, the occurrence of the theft is notified to the management terminal 29 and the user terminal.

The content of the notification in this case includes a) occurrence of the theft
b) specification of the vehicle or the machine 10 whose fuel was stolen,
c) time when the theft occurred,
d) the amount of fuel extracted,
e) Impact on subsequent work of the vehicle or the machine 10 and the like.

Further, regarding above e), for the vehicle or the machine 10 from which the fuel was stolen due to the theft, the refueling plan calculation means 25 calculates the refueling plan so as to preferentially refuel the vehicle or the machine 10. Therefore, the subsequent, operation schedule is adjusted, and early refueling can be carried out so that the non-operating time of the vehicle or the machine 10 is not generated, or the non-operating time can be shortened. In addition, since the occurrence of theft is promptly notified and the damage can be accurately grasped, the theft damage can be minimized and the criminal is more likely to be arrested. Moreover, by disclosing that the theft monitoring function is provided, the effect of preventing theft is achieved.

In the above embodiments, it has been described that, for example, machine learning is used for the analysis of the remaining fuel amount in the analyzing means 22 and the calculation of the refueling plan in the refueling plan calculation means, but these embodiments are not limited thereto. It is also possible to use, for example, analysis and calculation that uses artificial intelligence.

REFERENCE SIGNS LIST 1 vehicle-mounted device
10 machine
11 vehicle-mounted device
12 remaining fuel amount sensor
13 fuel meter
14 hour meter
16 wireless communication network
20 server
21 input means
22 analyzing means
23 learning means
24 storage means
25 refueling plan calculation means
26 output means
27 refueling means
28 user terminal
29 management terminal
30 liquid level detecting circuit
31 float
32 sliding piece
33 resistor

The invention claimed is:

1. A server comprising:
a means for acquiring vehicle information including a measured value of a remaining fuel amount of a vehicle or a machine from a vehicle-mounted device;
a storage means for storing at least information regarding an operation schedule of the vehicle or the machine;
a learning means for calculating a fuel consumption efficiency of the vehicle or the machine based on the remaining fuel amount and the information regarding the operation schedule;
an analyzing means for calculating a predicted value of a remaining fuel amount of the vehicle or the machine based on the measured value, the information regarding the operation schedule and the fuel consumption efficiency;
a refueling plan calculation means for autonomously calculating a refueling plan for the vehicle or the machine based on the prediction value; and
an output means for outputting the refueling plan to a refueling means; wherein
the information regarding the operation schedule includes operation information of the vehicle or the machine and a refueling time when fuel is to be refueled to the vehicle or the machine,
the refueling plan includes the refueling time and a refueling amount of the vehicle or the machine,
the refueling plan calculation means changes the refueling time included in the information regarding the operation schedule stored in the storage means when detecting that the refueling time included in the refueling plan, and
the server further outputs to a user terminal at least any one information of the vehicle information, the information stored in the storage means, predicted value calculated by the analyzing means and the refueling plan calculated by the refueling plan calculation means.

2. The server according to claim 1, wherein
the server issues a refueling notification to the vehicle or the machine when the measured value of the vehicle or the machine is lower than a refueling notification remaining amount, and
the refueling plan calculation means brings forward the refueling plan for the vehicle or the machine to which the refueling notification was issued.

3. The server according to claim 1, wherein
the refueling plan calculation means calculates an amount of fuel necessary for the vehicle or the machine according to an operation time scheduled until a next refueling time, and
the refueling plan calculation means calculates the refueling amount included in the refueling plan based on the amount of fuel.

4. The server according to claim 1, wherein
the vehicle information includes an amount of fuel which is refueled to the vehicle or the machine by the refueling means.

5. The server according to claim 1, wherein
the refueling plan calculation means recalculates the refueling plan when the theft is detected by the analyzing means.

6. A remote fuel monitoring method comprising the steps of;
acquiring, at a server, vehicle information including a measured value of a remaining fuel amount of a vehicle or a machine from a vehicle-mounted device;
storing, at the server, at least information regarding an operation schedule of the vehicle or the machine;
calculating, at the server, a fuel consumption efficiency of the vehicle or the machine based on the remaining fuel amount and the information regarding the operation schedule;
calculating, at the server, a predicted value of a remaining fuel amount of the vehicle or the machine based on the measured value, the information regarding the operation schedule and the fuel consumption efficiency;
calculating autonomously, at the server, a refueling plan for the vehicle or the machine based on the prediction value; and
outputting, at the server, the refueling plan to a refueling means; wherein
the information regarding the operation schedule includes operation information of the vehicle or the machine and a refueling time when fuel is to be refueled to the vehicle or the machine,
the refueling plan includes the refueling time and a refueling amount of the vehicle or the machine, and
the method further comprises the step of changing the refueling time included in the information regarding the operation schedule stored in the storage means when detecting that the refueling time included in the refueling plan; and
outputting, from the server to a user terminal, at least any one information of the vehicle information, the information stored in the storage means, predicted value calculated by the analyzing means and the refueling plan calculated by the refueling plan calculation means.

7. A server comprising:
a means for acquiring vehicle information including a measured value of a remaining fuel amount of a vehicle or a machine from a vehicle-mounted device;
a storage means for storing at least information regarding an operation schedule of the vehicle or the machine;

a learning means for calculating a fuel consumption efficiency of the vehicle or the machine based on the remaining fuel amount and the information regarding the operation schedule;

an analyzing means for calculating a predicted value of a remaining fuel amount of the vehicle or the machine based on the measured value, the information regarding the operation schedule and the fuel consumption efficiency;

a refueling plan calculation means for autonomously calculating a refueling plan for the vehicle or the machine based on the prediction value; and an output means for outputting the refueling plan to a refueling means;

wherein the information regarding the operation schedule includes operation information of the vehicle or the machine and a refueling time when fuel is to be refueled to the vehicle or the machine, the refueling plan includes the refueling time and a refueling amount of the vehicle or the machine, the refueling plan calculation means changes the refueling time included in the information regarding the operation schedule stored in the storage means when detecting that the refueling time included in the refueling plan, the analyzing means detects a theft of fuel from the vehicle or the machine based on the measured value and the information regarding the operation schedule, and the server notifies the theft to at least one of a management terminal and a user terminal when the theft is detected by the analyzing means.

8. A remote fuel monitoring method comprising the steps of;

acquiring, at a server, vehicle information including a measured value of a remaining fuel amount of a vehicle or a machine from a vehicle-mounted device;

storing, at the server, at least information regarding an operation schedule of the vehicle or the machine;

calculating, at the server, a fuel consumption efficiency of the vehicle or the machine based on the remaining fuel amount and the information regarding the operation schedule;

calculating, at the server, a predicted value of a remaining fuel amount of the vehicle or the machine based on the measured value, the information regarding the operation schedule and the fuel consumption efficiency;

calculating autonomously, at the server, a refueling plan for the vehicle or the machine based on the prediction value; and outputting, at the server, the refueling plan to a refueling means; wherein the information regarding the operation schedule includes operation information of the vehicle or the machine and a refueling time when fuel is to be refueled to the vehicle or the machine, the refueling plan includes the refueling time and a refueling amount of the vehicle or the machine, and the method further comprises the step of:

changing the refueling time included in the information regarding the operation schedule stored in the storage means when detecting that the refueling time included in the refueling plan;

detects, at the server, a theft of fuel from the vehicle or the machine based on the measured value and the information regarding the operation schedule, and notifying, from the server to at least one of a management terminal and a user terminal, the theft when the theft is detected.

* * * * *